United States Patent Office 3,504,723
Patented Apr. 7, 1970

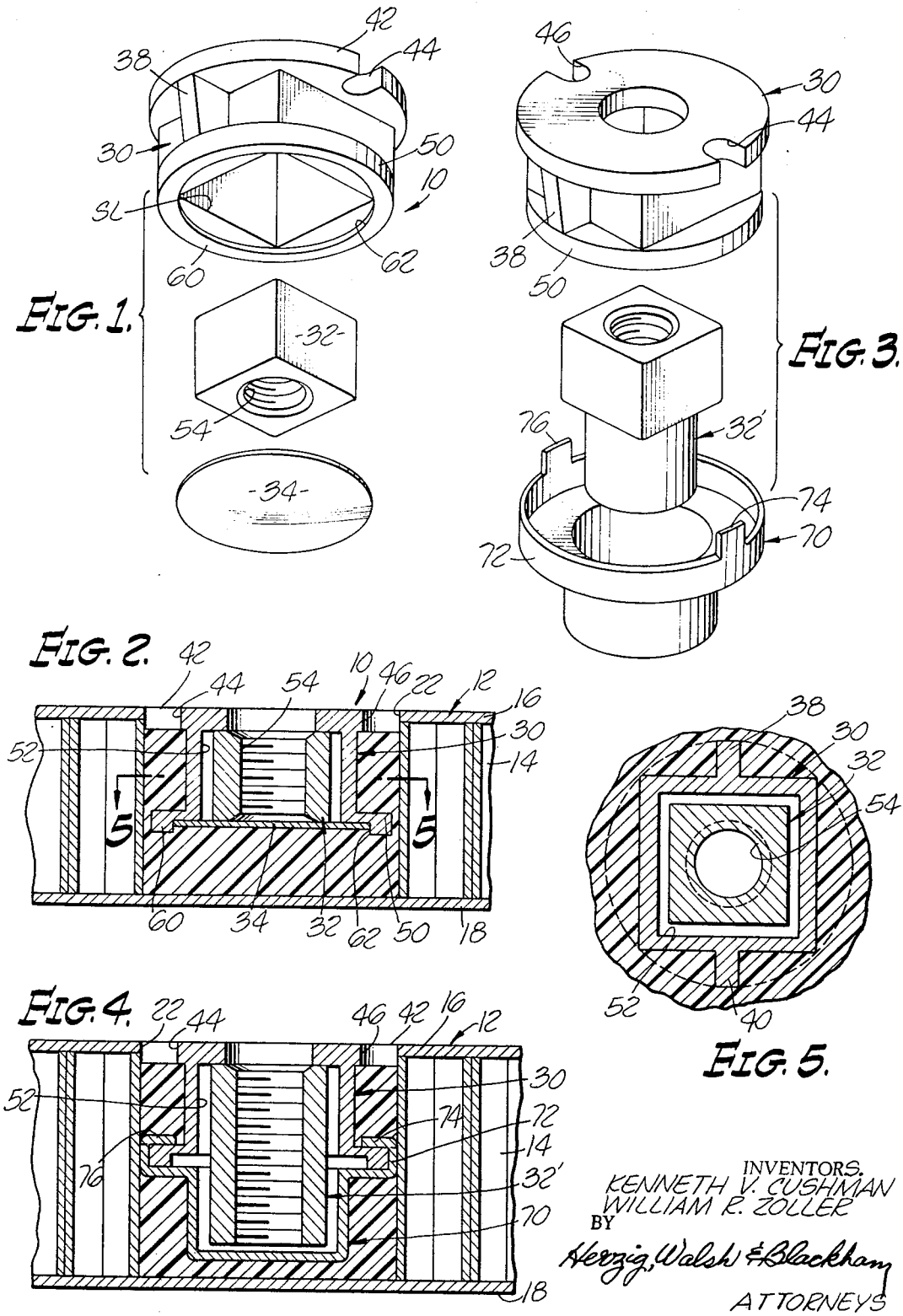

1

3,504,723
FLOATING NUT INSERT
Kenneth V. Cushman and William R. Zoller, Santa Ana, Calif., assignors to Delron Fastener Division Rex Chainbelt Inc., Santa Ana, Calif., a corporation of Wisconsin
Filed May 27, 1968, Ser. No. 732,262
Int. Cl. F16b 39/00
U.S. Cl. 151—41.7
4 Claims

ABSTRACT OF THE DISCLOSURE

The inventon is a fastener insert of the floating nut type adapted particularly for use as a "molded-in" fastener which is potted in. The nut in the insert floats to permit alignment with a securing bolt. The bore or space within the shell of the fastener is square and the floating nut is square but of smaller size to allow limited freedom of relative movement for alignment. The fastener insert can be made by die casting and its construction greatly facilitates fabrication processes.

SUMMARY OF THE DISCLOSURE

This invention relates generally to fasteners for lightweight sandwich panels such as are used in the interior walls and for construction of airplane fuselages, and in particular, to the type of fastener fitting known in the industry as a "molded insert" fastener. In general, such fasteners utilize a solidified body of cement or anchoring material, such as epoxy resin molded into a cavity in the sandwich panels and around the inserts so as to anchor the insert within the panel with one end of the insert exposed in an opening in one side of the panel for securement to the insert, and thus to the panel, of another fastener part which is a threaded member or screw extending through a bracket or the like to be attached to the panel and threaded into the insert.

In types of panels referred to, generally there is a central body or core constructed of extremely lightweight aluminum ribbon material, that is, foil, which because of the honeycomb cell structure provides adequate strength in the aggregrate over the entire area of the panel. The structure is cellular, the cells having parallel axes normal to the planes of the outer skin sheets. The strength is due to the extremely large number of cells of quite small diameter, and that the thin skin sheets are bound together in a fairly rigid, but extremely lightweight sandwich, construction. These panels, while having many advantages, present difficulties including the tendency of the attached parts to pull loose from the panels, and also to damaging of the panel surface where fasteners are riveted or otherwise forcibly attached to the panel.

The fastener insert described herein is of the type that is molded into the sanwich panel, the fastener embodying a shell having a cavity in which a body is caged in a floating condition so that it can align itself with an attaching bolt. The herein invention departs from conventional practices utilized in fabrication of inserts of this type in that a de cast body component or shell is utilized. This brings about a number of very advantageous results and benefits. This process makes it possible to achieve greater accuracy and uniformity while eliminating all secondary machining operations. It makes possible a configuration which simplifies the construction and configuration both of the shell or body and the floating nut. The cost of fabrication of both the body part and the nut can be very substantially reduced from the cost of fabrication by screw machining or similar processes. One of the great advantages of the use of the die casting process is that the fabri-

2 cation of intricate configurations is facilitated and which contribute to realization of ultimate objectives.

In a preferred form of the invention the body or shell of the fastener is made to be square externally so that the sides of the body itself provide the holding feature in that the engagement of the potting material with the body resists rotation. The bore or space within the shell is preferably made square and the floating nut is simply a section of square bar stock with an internally threaded opening. Limited freedom of movement of the nut within the shell is provided simply by way of the square nut fitting in a square bore or slightly larger size. These constructional features as described eliminate milling operations that are necessary when the fasteners are made by processes other than the process described herein. In a preferred form of the invention as described herein, the body or shell is additionally provided with radial ribs which contribute to the rotation resisting capability and strengthen the shell as well. Furthermore the potting holes in the head at the end of the insert are obtained without milling or drilling operations.

The space within the body of the fastener insert is closed at one end by way of a disc or cap secured to the body.

In the light of the foregoing, the primary object of this invention is to provide an improved fastener insert of the type described, particularly one which is fabricated by die casting and having the particular features referred to in the foregoing whereby the construction is simplified, made more economical and the strength of the fastener is nevertheless increased.

Another object is to provide a fastener insert of the type described wherein the nut is caged directly within the body or shell of the insert without retaining keys of the like, the limitation or rotation of the nut being by way of internal configuration of the space within the shell and the external configuration of the nut itself.

Further objects and additional advantages of the invention will become apparent from the following detailed description and annexed drawing wherein:

FIGURE 1 is an exploded view of a preferred form of the invention;

FIGURE 2 is a sectional view through a lightweight sandwich panel and through an insert like that of FIGURE 1;

FIGURE 3 is an exploded view of a modified form of the invention;

FIGURE 4 is a sectional view through a lightweight sandwich panel and through a fastener insert of the form shown in FIGURE 3;

FIGURE 5 is a sectional view taken along the lines 5—5 of FIGURE 2.

FIGURE 1 shows a preferred form of the fastener insert which is designated generally by the numeral 10 and FIGURE 2 shows this fastener insert installed or potted into a honeycomb panel designated generally at 12. The panel 12 is of a lightweight type commonly used in finishing the interior of airplanes where maximum lightness is required. Such panels are also used in fuselage skin construction and wing skin structures. In such a panel the central body or core 14 is commonly constructed of extremely lightweight aluminum ribbon material such as foil which because of the honeycomb cell structure provides adequate strength in the aggregate over the entire area of the panel. The axis of the cells formed are parallel and normal to the planes of the outer thin skin sheets 16 and 18. The outer skin sheets are bound together in a fairly rigid but extremely lightweight sandwich construction with an extremely large number of cells of quite small diameter between them. As indicated in the foregoing the primary object of the invention is to provide improved fastener insert means for making securement panels of the type shown in FIGURES 2 and 4. The skin sheets 16 and 18 are secured as by cementing, brazing or welding to the edges of the low density core 14. The panel is provided with a hole 22 which is closed at the bottom by the outer skin sheet 18. The hole 22 is circular and is bounded by the cellular walls of the core 14.

The fastener insert comprises a body part or shell as designated at 30; a nut 32 and a domed closure disc 34. As explained in the foregoing the shell or body part 30 is formed by a die casting process. The body 30 is generally square and has external configurations as may be seen in FIGURE 5 having ribs 38 and 40 that extend outwardly, that is, radially from the side walls and lie underneath a circular end flange 42. The end flange 42 has diametrically opposed openings in the form of radial slots 44 and 46 which form the potting openings and that are used for this purpose in installing the fastener in a manner well known in the art.

The shell or body 30 has a circular flange or rib 50 at its inner end. Within the shell or body 30 there is formed a square opening or space which may be called a bore although it is square in cross-section.

The nut 32 is formed simply from a section of square bar stock with an internally threaded bore 54 as shown. The nut 32 is slightly smaller than the size of the square opening or space 52 as may be seen in FIGURE 5.

The disc 34 is preferably slightly domed. FIGURE 2 shows it in installed position. The rib 50 on the body 30 forms an extending skirt as shown at 60 having an internal annular shoulder 62 as shown and the periphery of the disc 34 fits into this shoulder. The domed disc 34 is forced inwardly slightly tending to flatten it and to, therefore, expand it radially, and this action forces the sharp edges of the disc to extend or impregnate into the cast recess or skirt.

The fastener insert is potted into the panel 12 in a manner already known in the art using the potting openings 44 and 46. It will readily be observed that the insert when potted in accomplishes all of its desired objectives and purposes in an optimum way. Rotation of the insert itself is resisted and prevented by reason of the flat sides of the body or shell 30 and the ribs 38 and 40. The nut 32 has freedom to float, that is, to align itself with a stud bolt inserted through the opening 61 in flange 42. Although the nut 32 has freedom to float, rotation of the nut is limited by reason of its engagement within the square aperture or bore 52 in the barrel 30. The entrance of potting compound into the interior of the barrel 30 is prevented by the disc 34.

FIGURES 3 and 4 illustrate a modified form of the invention which is constructed and arranged to accommodate a nut 32' having a longer threaded length or having a longer threaded part as illustrated at 70 in FIGURE 4. The nut 32' has an extending cylindrical part as shown having a diameter equal to the cross section of the square stock from which the nut is made. The parts are like those of the previous embodiment but rather than using the disc 34 an end cap, or cup as designated at 70 is utilized. This cap or cup has an upper cylindrical part 72 which is enlarged and of a size to fit over and engage the bottom flange or rib 50 on the barrel 30. It has two extending tabs 74 and 76 which clamp over the flange 50 as illustrated in FIGURE 4. Extending downwardly from the upper enlarged part 72 is a lower part 80 of smaller diameter which is configurated to enclose the extending end of the nut 32' as illustrated in FIGURE 4 with 1/32" float or clearance, for example, on all sides. In this manner the fastener insert can be made to accommodate itself to or provide nuts of various threaded lengths, the cup or cap 70 serving to enclose the extending part keeping potting compound out of the interior of the fastener. Without tension on nut 32' as shown in FIGURE 5 the nut would ordinarily bottom out on the inside surfaces of the cap.

From the foregoing those skilled in the art will understand and appreciate the nature and construction of the invention and the manner in which it achieves and realizes all of the objects and advantages as set forth in the foregoing as well an many additional advantages that are apparent from the detailed description.

The foregoing disclosure is representative of preferred forms of the invention and is to be interpreted in an illustrative rather than a limiting sense.

What is claimed is:

1. A fastener insert for potting in lightweight panels, comprising:
    a generally circular upper flange having a central opening to receive a threaded fastener;
    a generally circular lower flange of less diameter than said upper flange;
    a body extending between said flanges and being generally square in cross-section and of no greater lateral dimensions than the diameter of said lower flange;
    a generally square opening extending from the bottom of said upper flage through said body and said lower flange and being of greater lateral dimensions than the diameter of said central opening;
    a internally threaded nut in said square opening and being of externally square shape throughout the length of said body, said nut being loose and capable of laterial movement to align the internal threads thereof with said central opening;
    a sheet metal closure secured to the bottom of said lower flange and closing said opening therethrough.

2. A fastener insert as defined in claim 1 including a flat rib extending between said flanges and radially outwardly from at least one of the sides of said body.

3. A fastener insert as defined in claim 1 including a shallow counterbore in the bottom of said lower flange, said closure comprising a disc pressed into said counterbore.

4. A fastener insert as defined in claim 1 wherein said closure comprises a depending cut-shaped member, said nut having a lower portion extending downwardly through said lower flange and into said cup-shaped member to provide internal threads of greater length than said body.

References Cited
UNITED STATES PATENTS

| | | | |
|---|---|---|---|
| 2,952,947 | 9/1960 | White | 151—41.76 |
| 3,019,865 | 2/1962 | Rohe | 151—41.7 |
| 3,130,765 | 4/1964 | Neuschotz | 151—41.7 |
| 3,176,747 | 4/1965 | Nenzell | 151—41.7 |
| 3,313,078 | 4/1967 | Rohe | 151—41.76 |
| 3,339,609 | 9/1967 | Cushman | 151—41.7 |

EDWARD C. ALLEN, Primary Examiner

U.S. Cl. X.R.

52—617; 151—41.76